Feb. 8, 1944.   J. L. MATTHEWS   2,340,972
MOLDING MACHINE
Filed Aug. 5, 1942   2 Sheets-Sheet 1

INVENTOR
JOSEPH L. MATTHEWS
BY Hogate, Neary & Campbell
ATTORNEYS

Feb. 8, 1944. J. L. MATTHEWS 2,340,972
MOLDING MACHINE
Filed Aug. 5, 1942 2 Sheets-Sheet 2
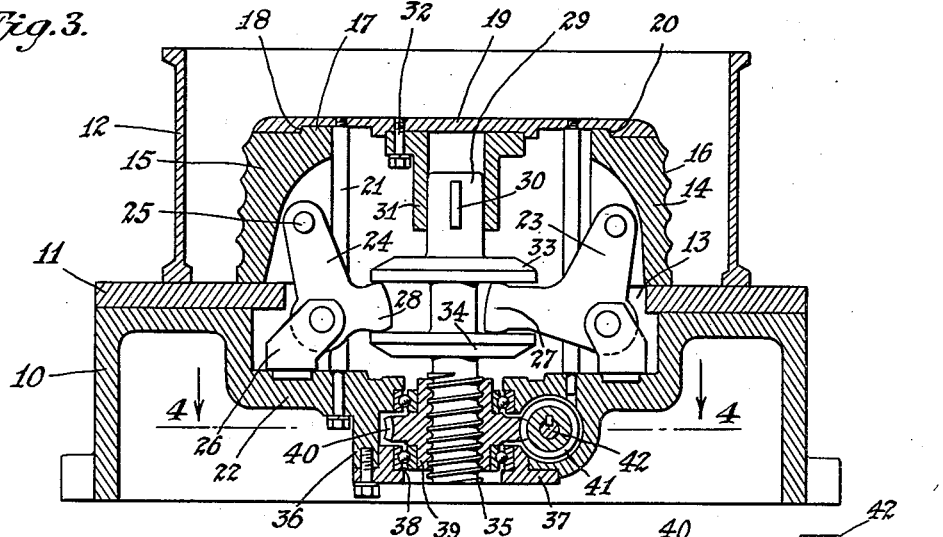
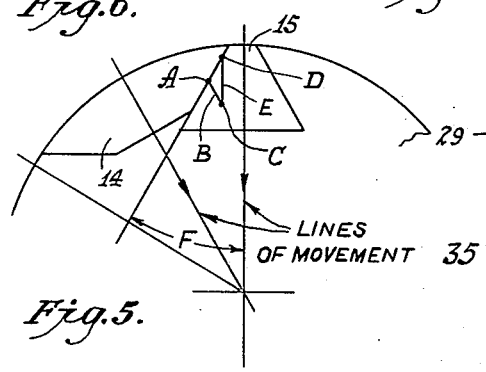
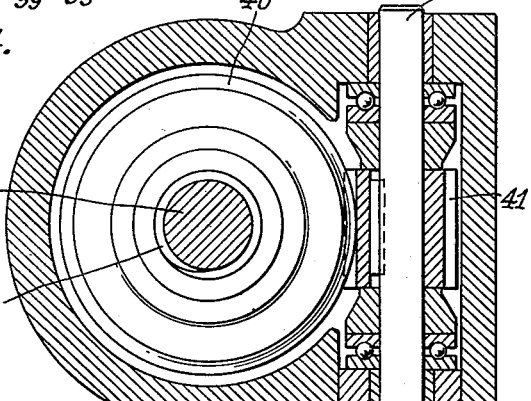
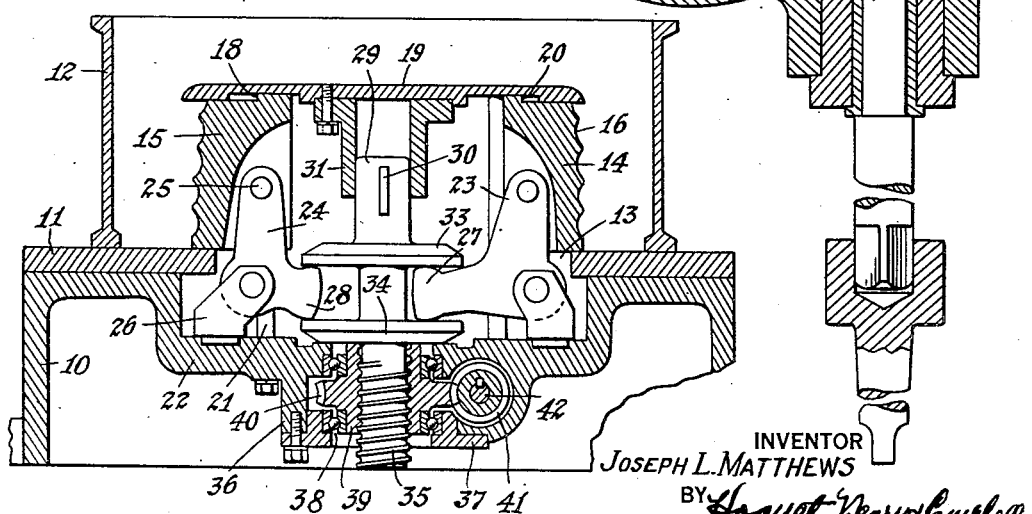
INVENTOR
JOSEPH L. MATTHEWS
BY
ATTORNEYS Patented Feb. 8, 1944

2,340,972

UNITED STATES PATENT OFFICE 2,340,972

MOLDING MACHINE

Joseph L. Matthews, Highland Park, N. J.

Application August 5, 1942, Serial No. 453,632

8 Claims. (Cl. 22—23)

The present invention relates to machines for making molds and embodies, more specifically, an improved form of molding machine by means of which molds may be made for casting objects having irregular surfaces and the like.

The invention has to do particularly with machines for manufacturing molds which are to be formed with ribs or surface irregularities and configurations wherein continuity of surface, with respect to certain portions of the mold is important.

In molding practice as at present carried out, the most effective manner of casting objects such as brake drums and the like which are preferably formed with ribs on the outer surfaces thereof, is to utilize cores and core boxes in order that, in casting, the desired shape may be imparted to the article to be cast. However, the cores must necessarily be baked and frequently trouble is caused because of the difficulty of setting up the cores properly for the molding operation.

In accordance with the present invention, it is proposed to provide a machine by means of which molds for brake drums and the like may be manufactured with the desired continuity of surface configuration so that, where continuous ribs and the like are desired, they may be formed in the mold as smooth and continuous ribs, the operation of the machine being of such character as to avoid many of the difficult and troublesome operations now required in conventional molding practice.

A further object of the invention is to provide a molding machine having movable form sectors of such construction that the mold may be shaped completely as desired and then the sectors retracted to permit the mold to be removed from the machine.

A further object of the invention is to provide an improved operating and control mechanism for a molding machine of the above character.

A further object of the invention is to provide, in a molding machine of the above character, movable sector structure and operating mechanism therefor, by means of which a proper contact may be maintained at all times between the adjacent and contacting surfaces of the sectors.

Further objects of the invention will be apparent as it is described in greater detail in connection with the accompanying drawings, wherein:

Fig. 3 is a view in section, taken on the broken plane 3—3 of Fig. 2 and looking in the direction of the arrows, this view illustrating the operating mechanism for the form sectors.

Fig. 4 is a view, in section, taken on the line 4—4 of Fig. 3 and looking in the direction of the arrows.

Fig. 5 is a view similar to Fig. 4, showing the form sectors in a retracted position.

Fig. 6 is a diagrammatic illustration of the manner in which movement of the segments is accomplished to maintain the contacting surfaces thereof in constant contact at all times.

Figure 1:
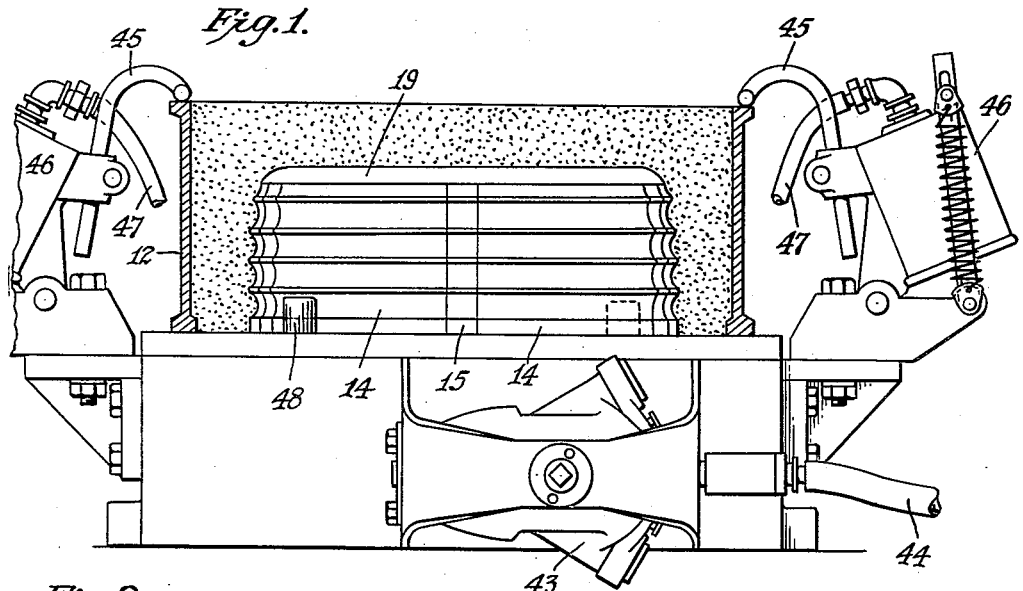
Fig. 1 is a view in front elevation, partly broken away and in section, showing a molding machine constructed in accordance with the present invention.
Figure 2:
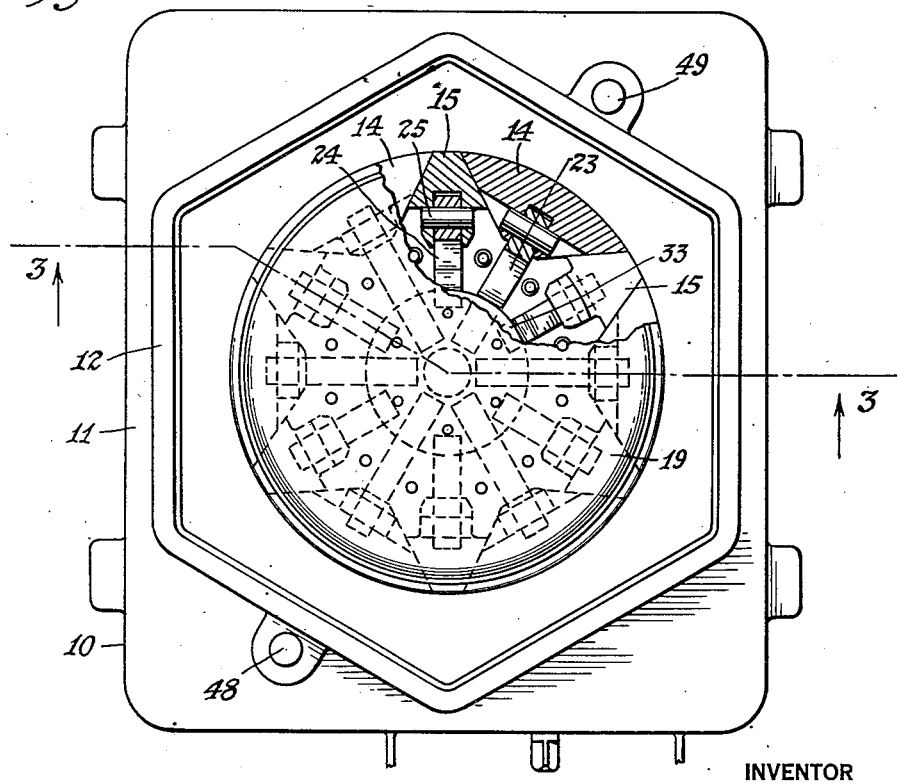
Fig. 2 is a plan view, partly broken away and in section, of the machine of Fig. 1.

Referring to the above drawings, the molding machine will be seen to consist of a foundation 10 having a bottom plate or support 11 upon which a cope flask 12 is adapted to be received. The bottom plate 11 is formed with a central opening 13 within which operating mechanism to be presently described is received.

Upon the bottom plate 11 and immediately adjacent the opening 13, a plurality of form sectors 14 and 15 are mounted. The outer surfaces 16 of the sectors are so designed that, when in the forming position, they form the desired surface configuration to be imparted to the mold. For example, in Fig. 1, the sectors are shown as being formed to provide continuous ribs such as might be desired in the casting of a brake drum.

Each sector 15 and 16 is provided with a top lug 17, forming a shoulder 18 which serves as a means for locating the sector accurately in the forming position, as illustrated in Figs. 1 and 3.

A top plate 19 is provided with a peripheral shoulder 20 that cooperates with the shoulders 18 and thus serves as a means for locating the form sectors accurately in the positions illustrated in Figs. 1 and 3.

The top plate is secured in position by means of through bolts 21 which are secured to the dropped central portion 22 of the foundation 10.

Each sector 14 is provided with a bell crank lever 23 and each sector 15 with a bell crank lever 24. Pins 25 are provided for pivotally securing the bell crank levers to the respective sectors, and brackets 26 are mounted on the dropped portion 22 of the foundation 10 in order that the bell crank levers may be properly positioned for moving the sectors. Bell crank lever 23 is formed with an operating arm 27, while bell crank lever 24 is formed with an operating arm 28.

A shaft 29 is provided centrally of the machine and is formed with a spline 30 that is received in a leeve 31 that is secured to the top plate 17 by means of bolts 32. This structure causes the shaft 29 to be accurately centered and slidably mounted with provision for vertical movement. Top and bottom flanges 33 and 34, respectively, are formed on the shaft 29 and the lower end of the shaft is threaded as shown at 35.

The central portion of the dropped foundation part 22 is provided with a sleeve 36 and a retainer plate 37 by means of which bearings 38 may be provided for journaling a sleeve 39. The sleeve 39 is formed with a worm wheel 40 on its outer periphery and, internally, is threaded to engage the threads 35 on the shaft 29. It will thus be seen that rotation of the sleeve 39 upon its axis will cause the shaft 29 to be raised or lowered, depending upon the direction of rotation of the sleeve.

The worm wheel 40 is driven by means of a worm 41 keyed to a drive shaft 42 that is driven by a suitable air operated motor 43 as illustrated in Fig. 1. Air may be supplied to the motor 43 by means of pipe 44.

In operation, it is important that the molding sand be prevented from entering between the form sectors and to accomplish this, the joint surface between adjacent sectors must always remain in contact, not only during movement but while the sectors are in their molding position or their retracted positions. This is accomplished by forming the sectors as illustrated and moving the sectors 15 more rapidly than the sectors 14 are moved. In the form of the invention illustrated in the drawings, this is accomplished by making the operating arms 28 shorter than the arms 27 by an amount sufficient to cause the sectors 15 to move approximately twice as fast as the sectors 14. For example, in Fig. 6 it will be seen that the angle F represents the angle between a radial plane passing through the axis of the segments 15 and the plane in which the contacting surfaces of segments 14 and 15 lie. In Fig. 6, the segments are illustrated as being in their expanded position. In the movement of segment 14 to its retracted position, the point on the contacting face of the segment will move along the line B to the point C. Simultaneously, the point D on the contacting face of segment 15 will move along the line E to the point C, and the segments will be brought to their retracted position while maintaining the adjacent faces thereof in constant contact. Movement of the segments in the opposite direction to the expanded position will result in movement of the points A and D in the reverse direction along the respective lines B and E. By moving the segments at different radial speeds, ribs and other essential conformation on the outer faces of the segments can be provided in substantially any form and size desired.

It will be observed that it is a relatively simple matter to form the shapes of the sectors such that their joint surfaces will always be in contact by utilizing a proper lever arm ratio between the bell crank levers operating the respective sectors. Thus, the sectors may be moved to a retracted position to afford sufficient clearance in order that the mold may be lifted free from the machine.

In operation, the cope flask 12 is placed in position upon the bottom plate 11 and locked by means of suitable clamps 45 operated by pneumatic mechanism 46 that is supplied with air under pressure through a pipe 47. The form sectors, previously having been moved to their retracted position as illustrated in Fig. 5 are properly centered with respect to the flask since locating lugs 48 are provided over which apertured ears 49 of the cope flask fit.

The cope flask is in position as illustrated in Figs. 1, 2, 3, and 5 of the drawings and the air clamps 45 are actuated to hold it in such position. The flask is then filled with molding sand and packed down in any desired fashion, as is well known in the art. When the sand is properly packed, the shaft 29 is raised by the operating mechanism previously described, thus causing the form sectors 14 and 15 to be moved outwardly to their expanded position. When the form sectors are fully expanded, the mold is formed and the sectors are retracted, the clamps 45 released and the flask is removed.

It will be apparent that the foregoing mechanism provides an effective machine by means of which molds may be formed having projecting surfaces, the resulting molds providing the desired continuity of surface.

While the invention has been described with reference to the specific drawings herein, it is not to be limited save as defined in the appended claims.

I claim:

1. A molding form comprising a first series of segments movably mounted on a support and adapted to form a body, said segments having angular sides converging toward a point within the body, a second series of segments alternating in position with the first segments of the first series and movably mounted on said support and having angular sides matching the angular sides of the segments of the first series, means adapted to simultaneously move each of the segments of the first series in a radial direction, and means to move the segments of the second series with a greater speed of movement than the segments of the first series whereby the angular sides of the segments will be continually in contact.

2. A molding machine comprising a support, a plurality of form segments movably mounted on the support, a cope flask adapted to be mounted on the support, and common means to move alternate segments simultaneously radially and the remaining segments simultaneously radially at a different radial speed than the first named alternate segments.

3. A molding machine comprising a support, a plurality of form segments movably mounted on the support, a cope flask adapted to be mounted on the support, and common means to move the segments radially with their adjacent surfaces constantly in contact.

4. A molding machine comprising a support, a plurality of form segments movably mounted on the support, a cope flask adapted to be mounted on the support, a top plate over the segments, means to secure the top plate to the first named support, a shoulder on the under side of the top plate, shoulders on the tops of the segments adapted to engage the last named shoulder to limit outward movement of the segments, and means to move the segments radially.

5. A molding machine comprising a support, a plurality of form segments movably mounted on the support, a cope flask adapted to be mounted on the support, a plurality of similar bell crank levers connected respectively to alternate of the said segments, a plurality of second bell crank levers connected respectively to the other segments and being of such size that the adjacent sides of the segments remain in contact during movement of the said segments, and means to move the segments radially.

6. A molding machine comprising a support, a plurality of form segments movably mounted on the support, a cope flask adapted to be mounted on the support, a plurality of similar bell crank levers connected, respectively, to alternate of the said segments, a plurality of second bell crank levers connected respectively to the other segments and having segment operating arms one-half the length of the first levers, and means to move the segments radially.

7. A molding machine comprising a horizontal support, a plurality of form segments slidably mounted on the support, a cope flask removably mounted on the support, bell crank levers connected to the segments to move the same radially, a vertically movable shaft centrally of the segments having flanges engaging the bell crank levers, and means to move the shaft in opposite directions.

8. A molding machine comprising a horizontal support, a plurality of form segments slidably mounted on the support, a cope flask removably mounted on the support, bell crank levers connected to the segments to move the same radially, a vertically movable shaft centrally of the segments having flanges engaging the bell crank levers, a worm journaled in the machine against vertical movement, a threaded connection between the worm and last named shaft, and means to turn the worm.

JOSEPH L. MATTHEWS.